United States Patent
Pergande

(10) Patent No.: US 6,512,474 B2
(45) Date of Patent: Jan. 28, 2003

(54) ULTRA WIDEBAND SIGNAL SOURCE

(75) Inventor: Albert Pergande, Orlando, FL (US)

(73) Assignee: Lockhead Martin Corporation, Bethesda, MD (US)

( * ) Notice: Subject to any disclaimer, the term of this patent is extended or adjusted under 35 U.S.C. 154(b) by 49 days.

(21) Appl. No.: 09/862,456

(22) Filed: May 23, 2001

(65) Prior Publication Data

US 2002/0190890 A1 Dec. 19, 2002

(51) Int. Cl.[7] ............................................. G01S 13/00
(52) U.S. Cl. ........................... 342/21; 342/27; 342/82; 342/175; 375/130; 375/271; 375/295; 375/302; 332/144
(58) Field of Search ............................ 342/21, 82, 83, 342/84–88, 175, 195, 27, 28; 375/130–153, 271–285, 295, 302, 303–308; 332/103–116, 144–148

(56) References Cited

U.S. PATENT DOCUMENTS

| | | | |
|---|---|---|---|
| 3,916,324 A | 10/1975 | Shuda | |
| 4,438,519 A * | 3/1984 | Bose | 375/139 |
| 5,345,471 A | 9/1994 | McEwan | |
| 5,361,070 A | 11/1994 | McEwan | |
| 5,454,012 A * | 9/1995 | Takai et al. | 332/103 |
| 5,455,593 A | 10/1995 | Ross | |
| 5,457,394 A | 10/1995 | McEwan | |
| 5,465,094 A | 11/1995 | McEwan | |
| 5,523,760 A | 6/1996 | McEwan | |
| 5,589,838 A | 12/1996 | McEwan | |
| 5,764,699 A | 6/1998 | Needham et al. | |
| 5,883,591 A | 3/1999 | McEwan | |
| 5,901,172 A | 5/1999 | Fontana et al. | |
| 6,026,125 A | 2/2000 | Larrick, Jr. et al. | |
| 6,335,946 B1 * | 1/2002 | Winnberg | 375/132 |

\* cited by examiner

Primary Examiner—Bernarr E. Gregory
(74) Attorney, Agent, or Firm—Burns, Doane, Swecker & Mathis, LLP

(57) ABSTRACT

A method and system to create an ultra wideband (UWB) signal are disclosed. The UWB signal comprises a carrier frequency with each cycle reversing in phase. The UWB signal is generated from a limited number of high power narrow band amplifiers. Each amplifier's output signal is combined to produce the desired UWB signal. The combination may occur in a combiner network or in free space.

19 Claims, 4 Drawing Sheets

ULTRA WIDEBAND SIGNAL SOURCE

BACKGROUND OF THE INVENTION

1. Field of the Invention

The present invention relates to signal processing systems and methods. In particular, the present invention relates to a method and system for generating ultra wideband signals.

2. Background Information

Applications that can benefit from very wide band signal sources, include foliage penetrating radars, remote material identification, and the like. These applications often require high RF transmit power as well a very wide band signal to increase stand off range and/or improve system signal to noise ratios. Generating a high power ultra wideband (UWB) signal is very difficult. In addition to the normal problems of creating and handling high RF fields, the available devices for high power amplification are very dispersive. The dispersive characteristic of a high power broadband amplifier causes the different spectral components to experience vast phase and amplitude variation as they pass through the amplifier. This results in distortion of the desired signals. While it is possible to 'predistort' the signal before amplification, this is often a difficult and delicate process that is not desirable.

Known devices generate the desired signal at low power levels, using some sort of a synthesizer or waveform generator, then amplifying it in a broadband power amplifier. The dispersion characteristics of the broadband power amplifier, (phase vs. frequency) often distort the signal unacceptably. Therefore, there is a need for a method and system that eliminates the need for broadband high power amplifiers and the dispersion such devices produce.

SUMMARY OF THE INVENTION

The present invention is directed to methods and systems for generating an ultra wideband signal. An exemplary method comprises: generating a first tone that has a frequency one half of a desired frequency of the ultra wideband signal, wherein the ultra wideband signal is a sine wave that inverts phase every cycle; generating a second tone that has a frequency three halves of the desired frequency; amplifying the first and second tones independently to generate an amplified first tone and an amplified second tone; and combining the amplified first and second tones to form the ultra wideband signal. Additionally, the method provides for generating and combining additional tones to the first and second tones, wherein the additional tones have frequencies of, for example, five halves and seven halves of the desired frequency, respectively.

An exemplary system for generating an ultra wideband signal comprises: an oscillator that generates a first tone that has a frequency one half of a desired frequency of an ultra wideband signal, wherein the ultra wideband signal is a sine wave that inverts phase every cycle; a means for generating a second tone that has a frequency three halves of the desired frequency; a first amplifier that amplifies the first tone and a second amplifier that amplifies the second tone to generate an amplified first tone and an amplified second tone; and a means for combining the amplified first and second tones to form the ultra wideband signal.

BRIEF DESCRIPTION OF THE DRAWINGS

The above features and advantages of the invention, and additional features and advantages of the invention, will be better appreciated from the following detailed description of the invention made with reference to the drawings, wherein.

DETAILED DESCRIPTION OF THE PREFERRED EMBODIMENTS

Figure 1:
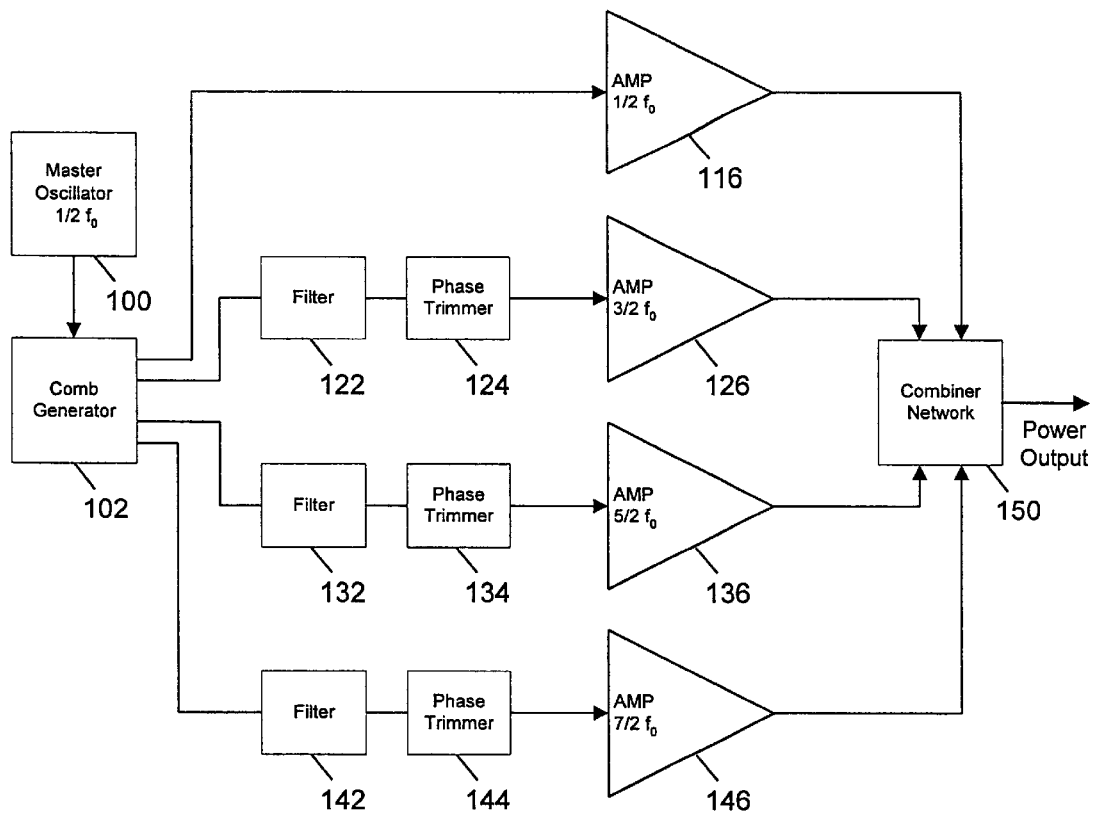
FIG. 1 is a block diagram illustrating an exemplary system of the invention.

FIG. 1 shows a block diagram of a system for generating an ultra wideband signal that has a phase shift at every cycle. The system has a master oscillator 100 that generates a first tone that has a frequency one half of a desired frequency or notional carrier frequency ($f_0$) of the ultra wideband signal. A comb generator 102 is shown as means for generating three outputs that correspond to second, third and fourth tones. However, one skilled in the art will appreciate that the additional tones may be generated by any circuitry that can create separate tones including, but not limited to, slave oscillators and the like. The second, third and fourth tones have frequencies, for example, at 3/2, 5/2, and 7/2 of the desired frequency, respectively.

A first amplifier 116 amplifies the first tone directly. The three outputs from the comb generator each are fed to three filters 122, 132, and 142, that filter each of the three outputs of the comb generator, thereby generating the second, third, and fourth tones. Those skilled in the art will appreciate that the various tones can be generated by other devices and techniques. For example, the tones can be generated using phase locked oscillators with a common reference or direct digital synthesizers with a common reference.

Additionally, three phase trimmers 124, 134, and 142, are provided in each path of the second, third, and fourth tones to compensate for the different phase lengths of each amplifier 126, 136, and 146. The signal combination is fairly insensitive to phase errors, and additional pulse or small deviation FM can be added to the signal if desired.

The amplified tones output from each of the amplifiers 116, 126, 136, and 146 are combined to form the ultra wideband signal in a means 150 for combining the amplified tones, such as a conventional hybrid combiner (e.g., a Wilkinson combiner, a toroid transformer, or the like) if the power amplifier outputs are in TEM transmission lines such as coax. Alternatively, the means 150 for combining the amplified tones could be a reflective antenna, wherein the amplified tones are applied to feed horns of the reflective antenna, such as in the feed of a Cassegrain antenna, thereby allowing the combination to occur in the near field of the antenna. Those skilled in the art will appreciate that for any given application, any combination of one or all of the tones generated can be combined to achieve an ultra wideband light of desired frequency and/or fidelity. Those skilled in the art will appreciate that for any given application, any combination of one or all of the tones generated, can be combined to achieve an ultra wide band signal of desired frequency and/or fidelity.

By placing the feed horns appropriately, the lowest frequency signal can illuminate the entire aperture, with higher frequency components illuminating smaller portions of the aperture. This will give nearly identical antenna patterns for each frequency, resulting in the desired signal in the antenna far field. Still further, the means 150 for combining the amplified tones can be an array antenna, wherein the amplified tones are applied to feeds of the array antenna, thereby allowing the combination to occur in free space.

The amplifiers 116, 126, 136, and 146 can be separate narrow band (e.g., 1% or less bandwidth) high power amplifiers. Each amplifier has a center frequency at the desired frequency of its associated tone. For instance, the center frequency of the first amplifier 116 is ½ the desired frequency. An advantageous feature in accordance with exemplary embodiments of the present invention is that the power required for each amplifier can decrease significantly as the frequency increases. In this case, the first tone requires most the power. Thus, the first amplifier 116 is rated for at least twice the power of the second amplifier 126. Additionally, the third amplifier 136 is rated for less than half the power of the second amplifier 126 and the fourth amplifier 146 is rated for less than half the power of the third amplifier 136. Of course, relative power ratings can be modified as desired to accommodate a specific application. Each amplifier, for example, can be a high power traveling-wave tube (TWT) or gyrotron amplifier. However, those skilled in the art will appreciate any amplifier rated for the power and frequency requirements can be used.

As an example, if the desired frequency ($f_0$) is 1 GHz, then the master oscillator 100 can have a frequency of 500 MHZ (or ½ $f_0$). The first amplifier 116 can have a center frequency of 500 MHZ and a power rating of 1000 watts. The second amplifier 126 can have a center frequency of 1500 MHZ (or 3/2 $f_0$) and a power rating of 333 watts. The third amplifier 136 can have a center frequency of 2500 MHZ (or 5/2$f_0$) and a power rating of 15 watts. Finally, the fourth amplifier 146 can have a center frequency of 3500 MHZ (or 7/2 $f_0$) and a power rating of 15 watts. As previously noted, most of the power is required for the 500 MHZ signal, with each of the higher tones' power requirements dropping rapidly. In fact, only 2 or three tones need to be combined to produce the desired signal with excellent fidelity. Since high power is more difficult to achieve at high frequencies, this scheme is very attractive. Most of the desired signal energy is produced at half the desired frequency, with relatively small additions at the higher frequencies.

Figure 2:
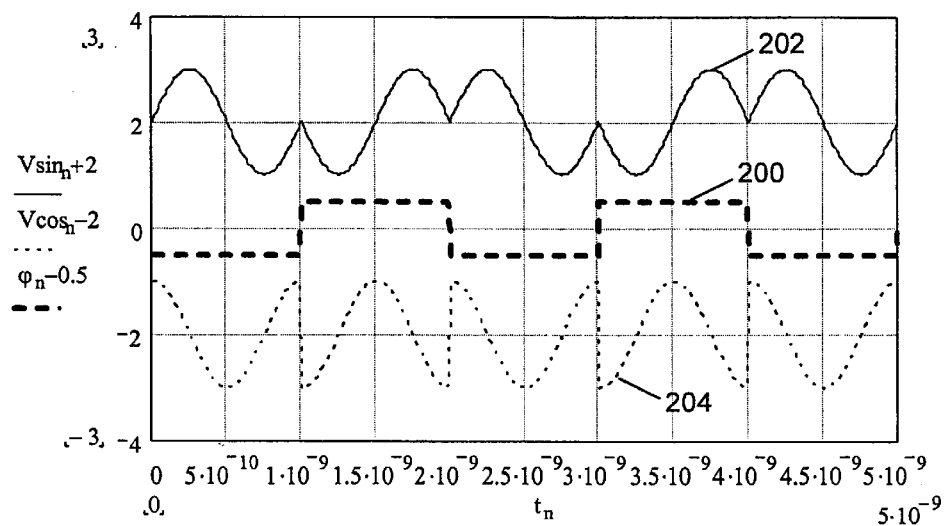
FIG. 2 is a graph showing an exemplary ultra wideband waveform of the present invention.

The ultra wideband signal 202 can be a sine wave at a microwave frequency that inverts phase every cycle as shown in FIG. 2. The sharp change in phase at each transition (as shown by waveform 200) emphasizes that the energy is in the desired transient electromagnetic fields. The ultra wideband signal 202 has a 1.0 GHz carrier frequency and is sampled to allow an FFT analysis of the waveform. These numbers are arbitrary as this method will work at any desired frequency. Additionally, the method is illustrated here for 180 degree phase shift every single cycle. Also shown is a cosine based waveform 204 that is at a microwave frequency and inverts phase every cycle.

Figure 3:
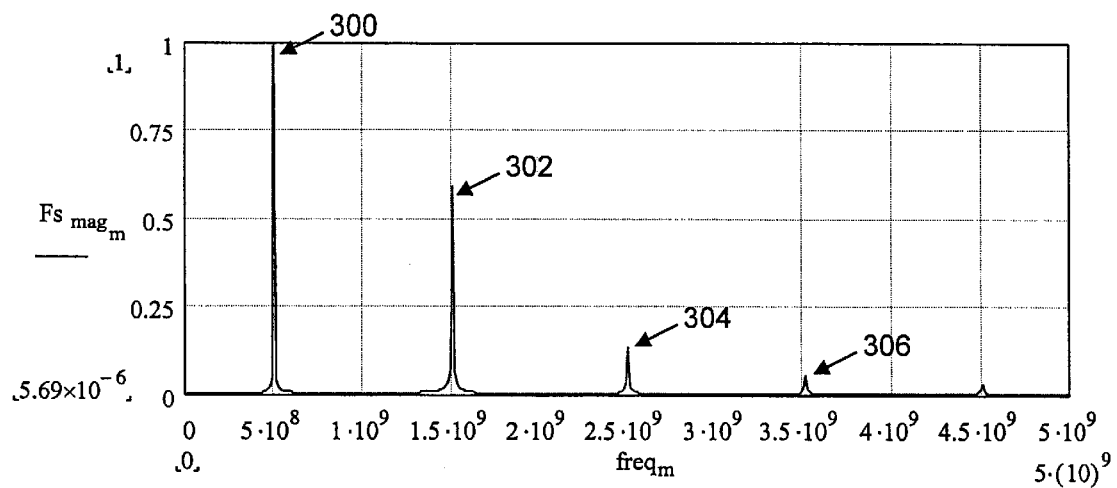
FIG. 3 is a graph of a spectrum of the FIG. 2 ultra wideband waveform.

FIG. 3 shows the spectral characteristics of the ultra wideband signal 202. The ultra wideband signal has only a few important spectral lines 300, 302, 304, and 306 (i.e., the tones at 2, 3/2, 5/2 and 7/2 of the desired frequency). By handling each spectral line individually, the dispersion characteristics of the individual power devices (i.e., amplifiers) becomes relatively unimportant as noted above. Also, the relative power necessary for each spectral line decreases rapidly as the frequency increases.

Figure 4:
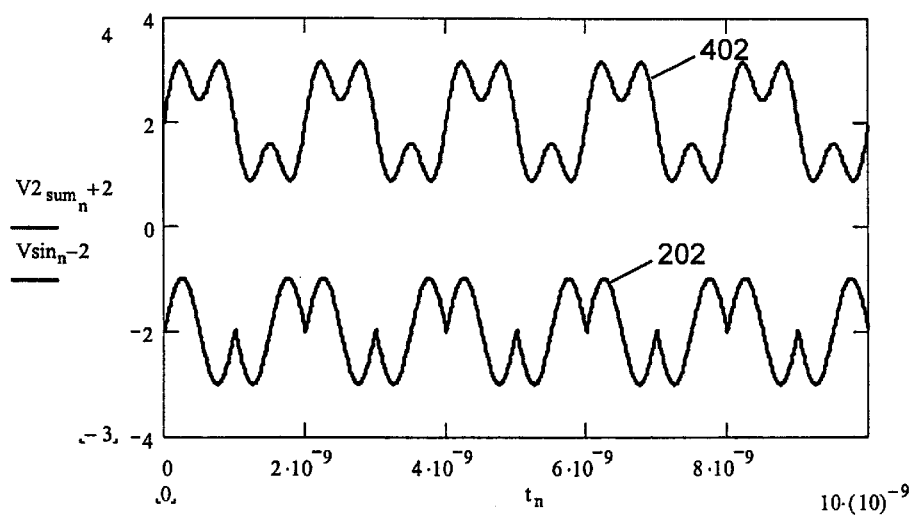
FIG. 4 is a graph showing the ultra wideband waveform and a waveform generated by combining the first and second tones.
Figure 5:
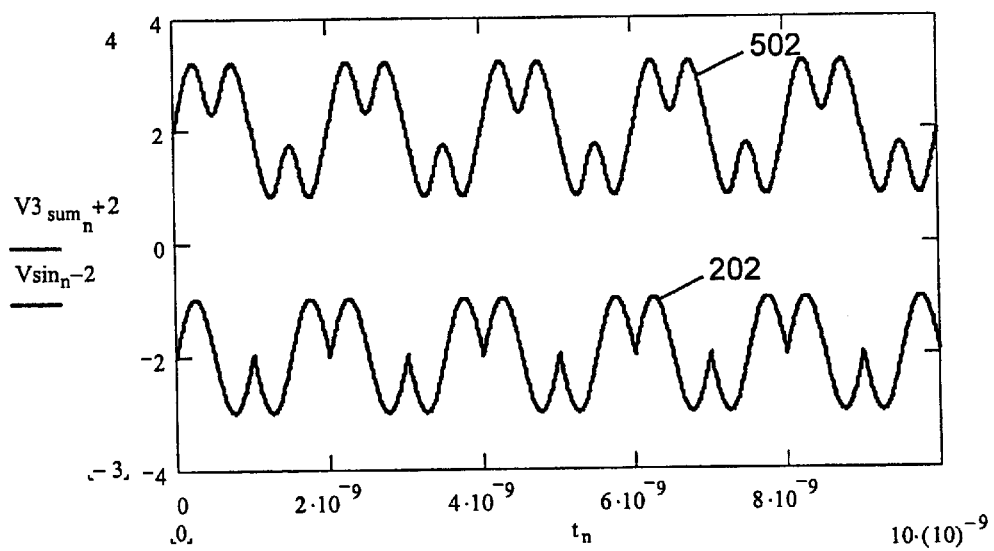
FIG. 5 is a graph showing the ultra wideband waveform and a waveform generated by combining the first, second, and third tones.
Figure 6:
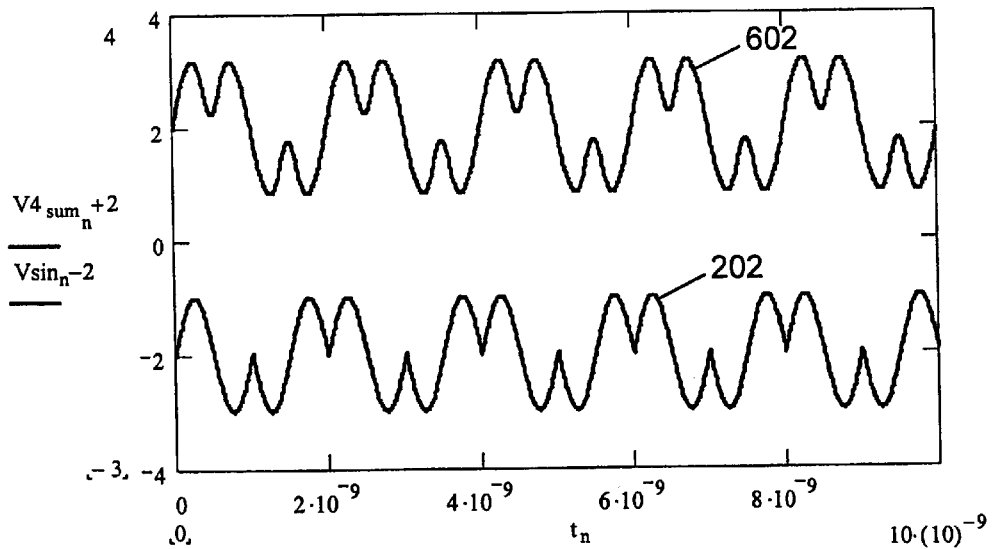
FIG. 6 is a graph showing the ultra wideband waveform and a waveform generated by combining the first, second, third, and fourth tones.

FIGS. 4–6 illustrate an exemplary combination of the various tones to produce the desired waveform 202. FIG. 4 shows the result of combining the first and second tone to form waveform 402. Waveform 402 reproduces the desired waveform 202, with very good fidelity using only two tones. The fidelity increases for waveforms 502 generated by combining the first, second and third tones, as shown in FIG. 5, respectively. The fidelity further increases for waveforms 602, which is generated by combining the first, second, third and fourth tones as shown in FIG. 6. If desired, the fidelity of the generated waveform can be increased even more by adding more of the higher frequency tones (i.e., tones of m/2 of the desired frequency for m=9, 11, . . . , etc.). However, those skilled in the art will appreciate the tradeoff between achieving greater fidelity and the cost/complexity concerns due to the increased number of amplifiers and related components. As a practical matter, four tones are the maximum necessary to achieve excellent results for the desired waveform. However, referring again to FIG. 4, even two tones will produce a very acceptable waveform.

Figure 7:
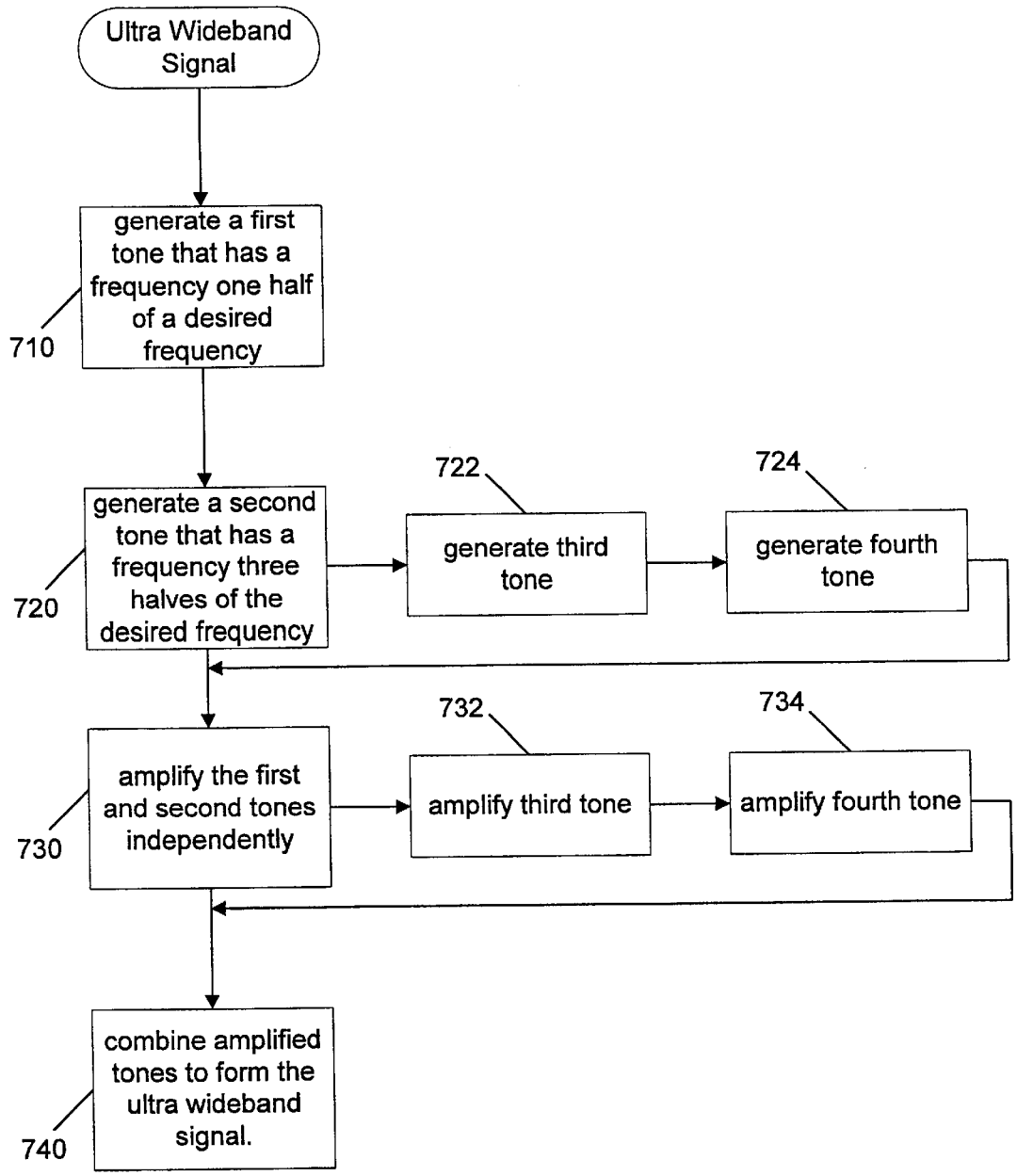
FIG. 7 is a flowchart of an exemplary method for generating an ultra wideband signal.

FIG. 7 is a flow chart of an exemplary method for generating an ultra wideband signal that has a phase shift at a given number of cycles. The method begins in step 710 by generating a first tone that has a frequency one half of a desired frequency of the ultra wideband signal. In step 720, a second tone is generated that has a frequency three halves of the desired frequency. Then, the first and second tones are amplified independently to generate an amplified first tone and an amplified second tone, in step 730. Finally, in step 740, the amplified first and second tones are combined to form the ultra wideband signal.

Optionally, if additional tones are desired to improve the fidelity of the wideband signal, then a third tone can be generated that has a frequency of, for example, five halves of the desired frequency, in step 722. Still further, a fourth tone can be generated, in step 724, that has a frequency seven halves of the desired frequency. Then, the third and fourth tones are amplified independently, thereby generating an amplified third tone and an amplified fourth tone, in steps 732 and 734, respectively. Once again, any or all of the amplified tones are combined to form the ultra wideband signal, in step 740.

Exemplary embodiments of the present invention provide numerous advantages. For example, using the present invention, it is much easier to achieve very high power with a narrow band device than with a broadband device. In addition, because the desired signal has only a few important spectral lines, each spectral line is individually processed. Therefore, the dispersion characteristics of the individual power devices present less of a problem in the system design. Each of the signals is added in phase with respect to the master oscillator signal. A simple phase shifter in the feed line of each of the power devices performs the needed phase compensation. Another advantage is that the recombination of the several signals to form the desired wavefront in space need not be done in the power amplifier transmission line, but can be performed in free space, such as in the feed of a Cassegrain antenna.

Exemplary embodiments provide a system to create a microwave signal that includes a carrier wave, with every other RF cycle flipped in phase and with a very high output power level. However, it will be appreciated by those skilled in the art that the invention is not limited to generating microwave signals. In general, the invention takes two or more harmonically related signal sources (i.e, one at half the notional carrier frequency and another at 3/2 the notional carrier frequency, with additional harmonics at (2n+1)/2 times the notional carrier frequency) and amplifies each with a narrow band high power amplifier. Thus, a small number of narrow band amplifiers are used create the desired wideband signal, which can be at frequencies above or below microwave frequencies.

The invention has been described herein with reference to particular embodiments. However, it will be readily apparent to those skilled in the art that it may be possible to embody the invention in specific forms other than those described above. This may be done without departing from the spirit of the invention. Embodiments described above are merely illustrative and should not be considered restrictive in any way. The scope of the invention is given by the appended claims, rather than the preceding description, and all variations and equivalents which fall within the range of the claims are intended to be embraced therein.

What is claimed is:

1. A method for generating an ultra wideband signal that has a phase shift at every cycle, the method comprising:
    generating a first tone that has a frequency one half of a desired frequency of the ultra wideband signal, wherein the ultra wideband signal is a sine wave that inverts phase every cycle;
    generating a second tone that has a frequency three halves of the desired frequency;
    amplifying the first and second tones independently to generate an amplified first tone and an amplified second tone; and
    combining the first and second amplified tones to form the ultra wideband signal.

2. The method of claim 1, further comprising:
    generating a third tone that has a frequency five halves of the desired frequency;
    generating a fourth tone that has a frequency seven halves of the desired frequency;
    amplifying the third and fourth tones independently, thereby generating an amplified third tone and an amplified fourth tone; and combining the third and fourth tones with the first and second tones to form the ultra wideband signal.

3. The method of claim 2, further comprising:
    generating a three outputs from a comb generator;
    filtering the three outputs, thereby generating the second, third, and fourth tones; and
    compensating for different phase lengths of each amplifier by using phase trimmers in each path of the second, third, and fourth tones.

4. The method of claim 1, wherein the amplified first and second tones are combined directly using a conventional hybrid combiner.

5. The method of claim 1, wherein the amplified first and second tones are applied to feed horns of a reflective antenna, to combine the first and second tones in a near field of the reflective antenna.

6. The method of claim 1, wherein the amplified first and second tones are applied to feeds of an array antenna, to combine the first and second tones in free space.

7. The method of claim 1, wherein the ultra wideband signal is at a microwave frequency.

8. The method of claim 1, wherein the first and second tones are amplified by separate narrow band high power amplifiers.

9. The method of claim 8, wherein the amplifier of the first tone has a rated power at least twice that of the amplifier of the second tone.

10. A system for generating an ultra wideband signal that has a phase shift at a given number of cycles, the system comprising:
    an oscillator that generates a first tone that has a frequency one half of a desired frequency of the ultra wideband signal, wherein the ultra wideband signal is a sine wave that inverts phase every cycle;
    a means for generating a second tone that has a frequency three halves of the desired frequency;
    a first amplifier that amplifies the first tone and a second amplifier that amplifies the second to generate an amplified first tone and an amplified second tone; and
    a means for combining the first and second amplified tones to form the ultra wideband signal.

11. The system of claim 10, further comprising:
    a means for generating a third tone that has a frequency five halves of the desired frequency;
    a means generating a fourth tone that has a frequency seven halves of the desired frequency; and
    a third amplifier that amplifies the third tone and a fourth amplifier that amplifies the fourth tone, thereby generating an amplified third tone and an amplified fourth tone, wherein the means for combining the first and second amplified tones also combine the third and fourth amplified tones with the first and second amplified to form the ultra wideband signal.

12. The system of claim 11, wherein the means for generating the second, third and fourth tones comprise:
    a comb generator that generates three outputs;
    three filters that filters the three outputs of the comb generator, thereby generating the second, third, and fourth tones; and
    three phase trimmers that compensate for different phase lengths of each amplifier in each path of the second, third, and fourth tones.

13. The system of claim 10, wherein means for combining the amplified first and second tones is a conventional hybrid combiner.

14. The system of claim 10, wherein the means for combining the amplified first and second tones is a reflective antenna, wherein the amplified first and second tones are applied to feeds of the reflective antenna to combine the first and second tones in a near field of the reflective antenna.

15. The system of claim 10, wherein the means for combining the amplified first and second tones is an array antenna, wherein the amplified first and second tones are applied to feeds of the array antenna, to combine the first and second tones in free space.

16. The system of claim 10, wherein the ultra wideband signal is at a microwave frequency.

17. The system of claim 10, wherein the first and second amplifiers are separate narrow band high power amplifiers.

18. The system of claim 17, wherein the first amplifier is rated for at least twice the power of the second amplifier.

19. The system of claim 17, wherein each amplifier is a high power traveling-wave tube or gyrotron amplifier.

* * * * *